United States Patent Office 3,367,466
Patented Feb. 6, 1968

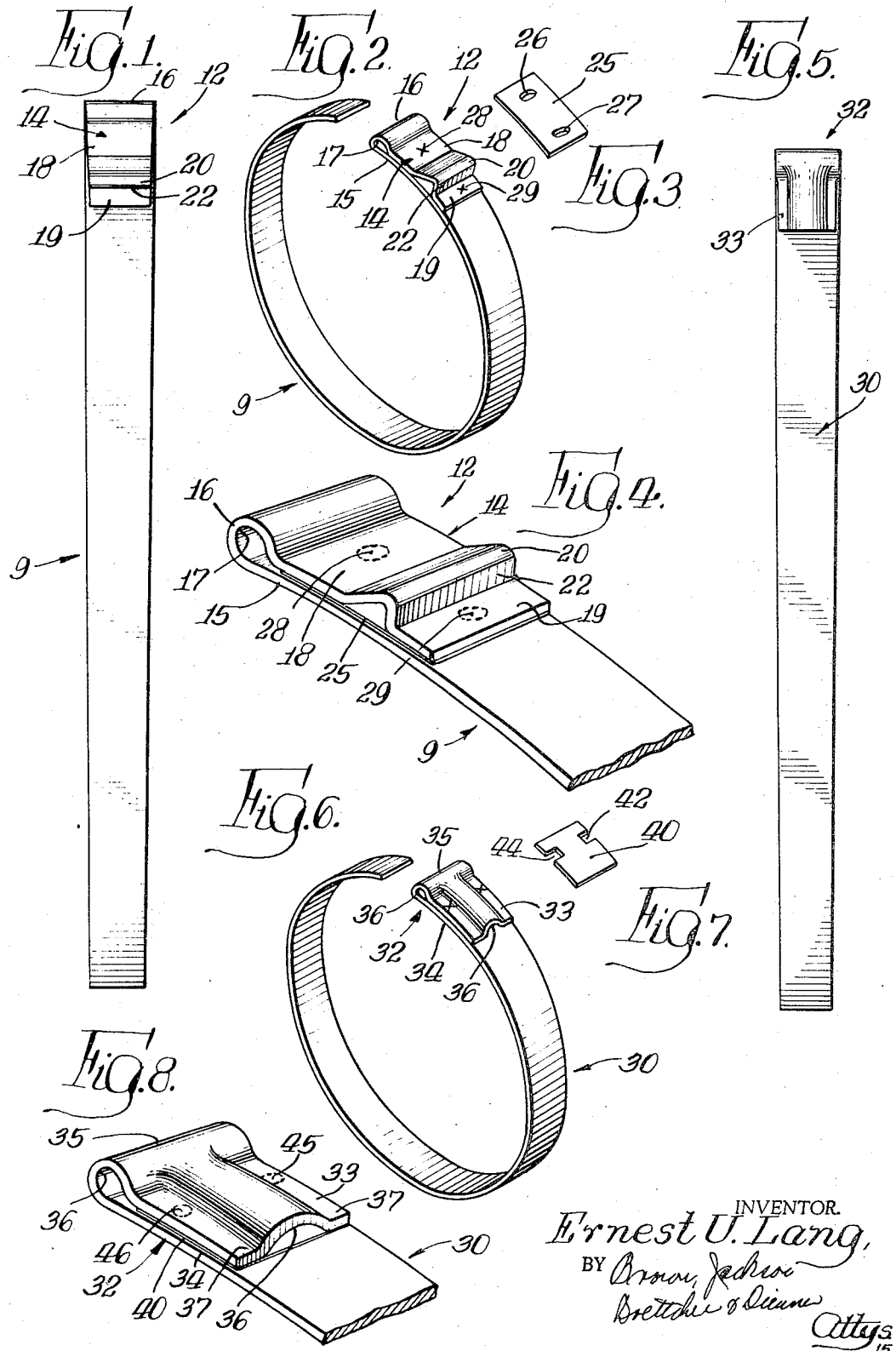

3,367,466
CLUTCH BANDS WITH BRAZED AND
WELDED ENDS
Ernest U. Lang, Niles, Mich., assignor to National-Standard Company, Niles, Mich., a corporation of Delaware
Filed Mar. 11, 1966, Ser. No. 533,680
4 Claims. (Cl. 192—107)

The present invention relates to clutch bands for use in free wheeling clutches of the type typically shown in United States Patent No. 2,518,453, issued Aug. 15, 1950, to John M. Dodwell.

The clutch of the aforementioned patent embodies essentially drive and driven clutch members, one of which is provided with a V-groove in which clutch band means is disposed, and in which one end of such band means is fixed or anchored to the other of such clutch members. The arrangement is such that upon rotation of the drive member in one direction, the driven member is driven in the same direction through engagement of the side edges of the clutch band means with the side walls of the V-groove, and which, when the driven member rotates at a faster speed than the drive member, the clutch band means permits the driven member to overrun the drive member.

The present invention is concerned with improved clutch band means for use in known clutch means typically disclosed in the above identified patent.

Considerable difficulty has been encountered in making commercially acceptable clutches of the aforementioned type with a major problem in that regard residing in providing an adequate anchor for the fixed or secured end of the clutch band means. One satisfactory approach to this problem has been achieved by providing an anchor formed by folding a portion of the metal at a terminal end of a clutch band back upon itself without reducing the thickness of the folded over metal. An anchor thus formed may satisfactorily fit in a pocket or recess in the clutch part to which the anchor end of the clutch band is to be secured, and with the folding over of one end of the band in a manner to provide driving and releasing faces of substantial height so as to retain engaging relation of such faces with the driving and releasing faces of the pocket or recess in the clutch part even after substantial wear of the clutch band means.

The aforenoted anchor end construction for a clutch band means of the character noted has proven highly satisfactory, and it is the purpose of the present invention to provide for effectively securing the folded over portion of the band to the adjacent underlying portion to define an anchor free of areas of weakness or fatigue.

Various proposals have been made for securing the folded over end portion to the underlying portion of the band such as by spot welding and brazing. It has been found that with welding of these two portions of the band to each other that the band structure is deleteriously affected, and fracture of the band frequently occurs at the anchor before an acceptable number of clutching operations for satisfactory commercial use have been effected. Brazing of the folded end of the band, however, provides a satisfactory structure but brazing, in turn, involves the problem easily and conveniently retaining the brazing material in position in securing the folded over end of the band to the underlying portion of the band.

Accordingly, it is an object of the present invention to provide novel clutch bands in which brazing material is incorporated in a unique manner between a folded over end portion and an underlying portion of a band.

The above and other objects and advantages of the invention will be apparent from the following detailed description of certain preferred embodiments of the invention.

Now in order to acquaint those skilled in the art with the manner of constructing and utilizing clutch bands in accordance with the present invention, certain preferred embodiments of the invention will be described in conjunction with the accompanying drawing.

In the drawings:

FIGURE 1 is a plan view of a band of one embodiment of the present invention prior to forming of the band into a generally spiral configuration;

FIGURE 2 is a perspective view of the band of FIGURE 1 having an anchor therefor formed by a folded over end portion of the band and before the folded over portion of the band is secured to the underlying portion of the band;

FIGURE 3 is a perspective view of a brazing component for insertion between the folded over end portion of the band of FIGURE 2 and the underlying portion thereof;

FIGURE 4 is a perspective view of the anchor end portion of the band of FIGURE 2 with the folded over portion of the band brazed by the brazing component of FIGURE 3 to the adjacent underlying portion of the band;

FIGURE 5 is a plan view of a band of another embodiment of the invention prior to forming of the band into a generally spiral configuration;

FIGURE 6 is a perspective view of the band of FIGURE 5 after being formed into a spiral configuration and showing a modified form of anchor construction formed by a folded over portion at the anchor end of the band;

FIGURE 7 is a perspective view of a brazing component for insertion between the folded over end portion of the band of FIGURE 6 and the underlying portion thereof; and FIGURE 8 is a perspective view of the anchor end portion of the band of FIGURE 6 with the folded over portion brazed by the brazing component of FIGURE 7 to the underlying portion of the band.

Referring now to FIGURE 1, there is shown a band 9 which may be formed from an appropriate length of suitable spring steel stock, cut from a supply source and tapered from one end to the other. After tapering of the stock the side edges may be coined and provided with a bevel. With such a strip of stock, the terminal end thereof of greatest width is fabricated in a manner hereinafter described to provide an anchor 12 shown in its completed form in FIGURE 4 of the drawings. In forming the anchor 12 an outer end portion 14 is disposed in superposed relation with respect to an adjacent inner end portion 15 in which the outer and inner end portions are connected by a transverse end fold 16 of generally tubular configuration to define a transversely extending opening 17. The fold 16 is preferably of a height in excess of twice the thickness of the metal from which the band is formed. The outer end portion 14 of the band as best seen in FIGURES 1, 3 and 4 comprises an intermediate portion 18 and an outermost end portion 19 between which a transverse hollow abutment or hump 20 is formed. The abutment 20 preferably is of a height substantially equal to the height of end fold 16. The fold 16 and face 22 of abutment 20 provide releasing and driving surfaces, respectively, for the clutch band when associated in a pocket or recess in a clutch part as disclosed in the above referred to Dodwell patent. After formation and disposition of the outer end portion 14 of band 9 as above described, brazing material, in the form of a strip as shown at 25 in FIGURE 3, is inserted between the opposed surfaces of the outer and inner end portions 14 and 15, respectively. The strip of brazing material 25 is preferably provided with a pair of openings 26 and 27 spaced apart so that the opening 26 lies between fold 16 and the hollow abutment 20 and the opening 27 lies between the hollow abutment 20 and the outermost end 19 of the outer end portion 14. With the brazing material thus assembled, opposed portions 28 and 29 of the outer and inner end portions 14 and 15 at the openings 26 and 27, respectively, are welded, as by spot welding, to secure the outer and inner end portions of the band to each other and to retain the brazing strip 25 in position therebetween. The band 9 is suitably formed into a generally spiral shape as shown in FIGURE 2 and the foregoing assembly of the brazing strip 25 may be effected either before or after imparting a spiral shape to the band 9. Thereafter, the spiralled band and brazing material are heat treated in a manner to be below described to provide for brazing of the outer and inner end portions to each other by the brazing material 25.

Referring now to FIGURES 5 through 8, there is shown another form of clutch band in accordance with the present invention in which a band 30, like band 9, is tapered and provided with coined edges, and at the end of maximum width is provided with an anchor 32, shown in its completed form in FIGURE 8 of the drawings. The anchor 32 comprises an outer end portion 33 and an inner end portion 34 disposed in superposed relation with respect to each other, and in which the outer and inner end portions 33 and 34 are connected by a transverse fold 35 of generally tubular configuration to define a transversely extending opening 36. The fold 35 is preferably of a height in excess of twice the thickness of the metal from which the band is formed. As shown, the outer end portion 33 is of arcuate configuration in transverse cross section and is disposed with its concave surface 36 facing the opposed upper surface of the inner end portion 34. The side edges 37—37 of the outer end portion are disposed adjacent and extend slightly inwardly of the side edges of the lower end portion 34 due to the taper of the band. In the structure described, the end fold 35 and the outermost end of the outer end portion 33 provide release and drive faces for the clutch band when arranged in a pocket of a clutch part as typically disclosed in the aforementioned Dodwell patent. The anchor 32 further comprises brazing material 40, in the form of a strip as shown in FIGURE 7, disposed between the opposed faces of the outer and inner end portions 33 and 34 at the wide terminal end of the band. The strip 40 is provided with recessed openings 42–44 at opposite sides thereof so that with the strip 40 assembled between the outer and inner end portions of the band as described, the portions of the latter opposite each other at the recessed openings 42 and 44 may be spot welded as at 45 and 46, respectively, to secure the strip 40 in position in the anchor of the band. As before the brazing strip 40 may be assembled in the anchor before or after forming the band 30 into spiral configuration as shown in FIGURE 6. Thereafter, the band 30, like the band 9 of FIGURES 1 through 4 may be heat treated as described below.

The clutch bands 9 and 30 preferably made from a high carbon flat steel stock, for example, 1095 or 1075 steel and either before or after brazing materials, such as strips 25 and 40, are assembled in the anchors 12 and 32, respectively, the bands 9 and 30 are wound on a suitable form into generally spiral configuration as illustrated in FIGURES 2 and 6, respectively. The brazing strips 25 and 40 may be of any suitable brazing material such as silver solder which has a brazing temperature of about 1200° F. with this material being characterized by being capable of withstanding temperatures up to 1700–1800° F. In lieu of brazing material of strip form the brazing material may be of any known and suitable brazing paste. After assembly of the brazing material and formation of the bands 6 and 30 into a spiral configuration, the bands and the brazing materials are heated to a temperature in a range of about 1400–1550° F. which temperature is sufficient to effect brazing of the brazing material to braze the outer and inner end portions of the clutch bands together and complete the anchors 12 and 32. Thereafter, the bands are quenched in oil at room temperature after which they are stressed relieved at a temperature range of about 400–500° F. After such heat treatment, quenching and stress relieving the bands are then preferably accurately shaped to the desired spiral configuration after which the bands are heat set at a temperature of about 650–750° F. depending largely on the hardness desired.

It is believed that it will be clear that upon fabrication of clutch bands as above described that they may be embodied with clutch drive and driven parts as typically disclosed in the aforementioned Dodwell patent to provide a clutch.

It is important to note in the aforedescribed constructions that the outer and inner end portions 14 and 15, and 33 and 34 of the bands 9 and 30, respectively, are welded to each other at relatively small areas as at 28 and 29, and 45 and 46, respectively. The openings 26 and 27 of the brazing strip 25 of FIGURE 3, and recessed openings 42 and 44 of the brazing strip 40 as shown in FIGURE 7, are of small area as compared to the total areas of the strips 25 and 40. The welds at 28 and 29, and at 45 and 46, preferably spot welds, in effect act as clamps to retain the brazing strips 25 and 40 in position in the fabrication of the clutch bands. The remaining portions of the opposed surfaces of the outer and inner end portions of the clutch bands are of large area and are brazed to each other to provide strong structures not subject to fatigue or weakness.

While certain preferred embodiments of the invention have been shown and described it will be obvious that various modifications and rearrangements may be made therein without departing from the spirit and scope of the invention.

I claim:

1. A clutch band comprising an elongated flat spring metal strip having an anchor at one terminal end thereof defined by an outer end portion disposed in superimposed relation with respect to an inner end portion, said outer and inner end portions having opposed small areas thereof welded to each other, and relatively large areas of said inner and outer end portions being brazed to each other.

2. The clutch band of claim 1 characterized by the provision of an end fold at the outer end of said anchor integral with and connecting said outer and inner end portions.

3. The clutch band of claim 1 characterized by the provision of an end fold at the outer end of said anchor integral with and connecting said outer and inner end portions, a hollow abutment extending transversely of said outer end portion between intermediate and outermost end portions of the latter, and in which said welded small areas of said outer and inner end portions lie between said fold and said abutment.

4. The clutch band of claim 1 in which said outer end portion comprises a portion of arcuate transverse cross-sectional configuration disposed with its concave surface in opposed relation with respect to the adjacent surface of said inner end portion, in which said welded small areas of outer and inner end portions lie in opposed side edges of said outer and inner end portions, and in which said brazed large areas are at opposed side edges of said outer and inner end portions.

References Cited

UNITED STATES PATENTS

| | | |
|---|---|---|
| 2,506,728 | 5/1950 | McGrath. |
| 2,510,727 | 6/1950 | Sussenbach. |
| 2,917,144 | 12/1959 | Dodwell _____ 192—41 |
| 3,266,131 | 8/1966 | Mallorg et al. |

CARLTON R. CROYLE, *Primary Examiner.*

BENJAMIN W. WYCHE III, *Examiner.*